Jan. 5, 1943.　　　　L. KRIEGSFELD　　　　2,307,687
DOLL'S EYE SET
Filed July 3, 1940
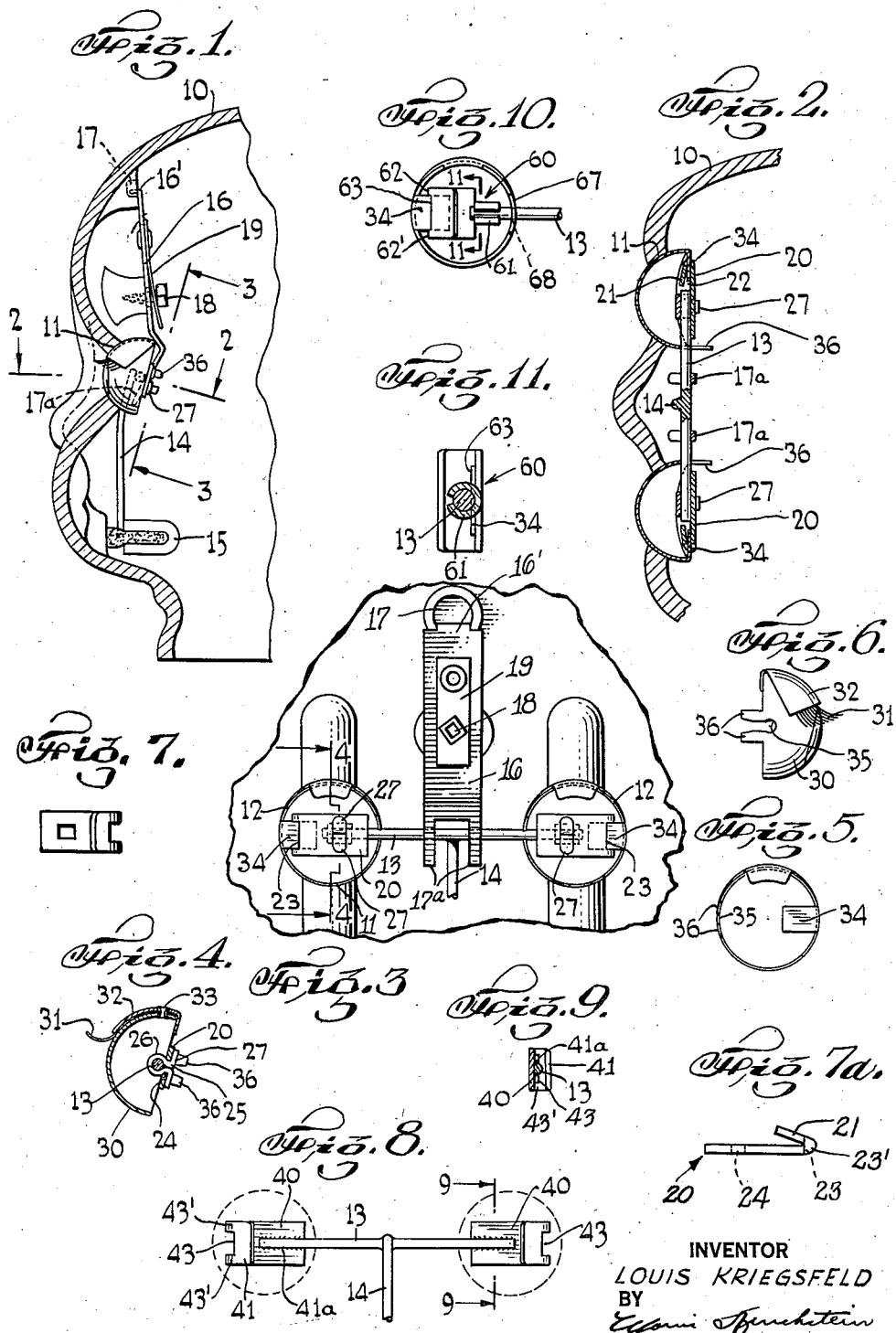
INVENTOR
LOUIS KRIEGSFELD
BY
ATTORNEY Patented Jan. 5, 1943

2,307,687

UNITED STATES PATENT OFFICE 2,307,687

DOLLS' EYE SET

Louis Kriegsfeld, Newark, N. J., assignor, by mesne assignments, to Margon Corporation, Bayonne, N. J., a corporation of New Jersey Application July 3, 1940, Serial No. 343,681

13 Claims. (Cl. 46—169)

This invention relates to dolls' eye sets.

One of the objects of this invention is to provide an eye set having highly improved and simplified means for independently adjusting the eyeballs both axially and rotatably with respect to the eye axle.

Another object of my invention is to provide an eye set of the character described which shall comprise but a few easily fabricated parts, which shall be simple and economical to manufacture and assemble, easy to adjust, and withal rugged in construction and efficient in use to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

In the accompanying drawing, in which are shown three of the various possible embodiments of this invention, Fig. 1 is an elevational view in section of a doll's head employing my improved eye set;

Fig. 2 is a sectional view taken substantially along the line 2—2 of Fig. 1;

Fig. 3 is a rear fragmentary view of the eye set shown in Fig. 1;

Fig. 4 is a sectional view taken substantially along the line 4—4 of Fig. 3;

Fig. 5 is a rear view of an eyeball constructed in accordance with my invention;

Fig. 6 is a side view thereof;

Fig. 7 is a front view of a holding member adapted to be used with an eyeball such as shown in Figs. 5 and 6;

Fig. 7a is a side view of the holding member shown in Fig. 7;

Fig. 8 is a view similar to Fig. 3 but showing a modified form of my invention;

Fig. 9 is a sectional view taken substantially along the line 9—9 of Fig. 8;

Fig. 10 is a view similar to Fig. 3 but showing another modified form of my invention; and Fig. 11 is a sectional view taken substantially along the line 11—11 of Fig. 10.

Referring now in detail to the drawing, 10 indicates a portion of a doll's head which may be molded or otherwise fabricated from wood pulp or other suitable composition material. The front wall of the head is provided with the usual appropriately spaced eye sockets terminating in eye openings 11 for receiving the eye balls 12. These are mounted with the usual eye set or eye mounting comprising an eye axle 13, to which is affixed the pendulum rod 14 carrying the weight 15, whereby the eye axle and eye balls are oscillated for waking and sleeping position, in the manner well known in the art. The eye set may be resiliently mounted in the doll's head in any suitable manner, as for example, by means of a plate 16 having at its upper end a projection 16' which is received in a recess 17 in the upper portion of the doll's head. The eye axle rests on a pair of spaced forwardly inclined legs 17a formed at the lower portion of the plate 16, and the latter is resiliently mounted in the doll's head by means of a screw 18 which abuts a leaf spring 19 anchored at its upper end to the plate 16.

As is well known in the art, it is practically impossible to make dolls' heads in quantity production so that the doll eye sockets are of uniform size and location. The eye sets are also usually made up in large quantities of various standard sizes for corresponding sizes of dolls' heads. It becomes necessary, therefore, in mounting any eye set in a doll's head, to properly adjust the eye balls.

In accordance with my invention, I provide a simple means for so mounting the eye balls 12 on the axle 13, that said eye balls may be independently adjusted both axially and rotatably with respect to said axle 13. Such means comprises a holding member 20 (see Figs. 3 and 7) consisting of a metal plate having one of its ends bent over to provide a lip portion 21 substantially parallel to and spaced a short distance from the body of the holding member 20 to form therewith a channel 22. The holding member 20 is notched at the bend to provide an aperture 23 and a pair of shoulders 23' disposed at either side of said aperture 23. The holding member 20 is also provided with another aperture 24 to receive the shank of a cotter pin 25 whose head 26 is constricted about and frictionally engages the eye set axle 13 and whose legs 27 are bent into contact with the rear face of the holding member 20.

The eyeball member 12 comprises a hemispherical eyeball shell 30, having the facsimile of a human eyeball suitably imprinted on its outer surface. Eyelashes 31 may be attached thereto in any manner well known to the art, such as by a rounded plate 32 fastened by an eyelet 33 to the shell 30 and frictionally gripping the eyelashes 31 between the plate 32 and said shell 30. The shell 30 is formed with a peripheral rearwardly extending tab 34 of a width slightly less than the width of the aperture 23, and has an arcuate recess 35 diametrically opposed to said tab 34 for freely receiving the axle 13. Extending rearwardly from the periphery of said shell 30 adjacent the recess 35, are a pair of arms 36 which define between them a wedge shaped slot slightly wider at the top than the diameter of the axle 13 and slightly narrower than said diameter at the bottom, to aid in locating and retaining the axle.

In assembling the eye set, constructed in accordance with the embodiment of my invention hereinabove described, the head 26 of the cotter pin is slipped over the end of the axle 13. The holding member 20, which has already been bent to provide the overlying lip portion 21 and notched to form the apertures 23 and 24, is then placed over the said end of the axle 13, the shank of the cotter pin being passed through the aperture 24. I next bend the legs 27 of the cotter pin outwardly and into abutment with the holding member 20, so that the holding member is frictionally mounted on the axle 13 so as to permit relative rotation between the member 20 and said axle. The tab 34 is now bent transversely of the open end of said hemispherical shell 30 and inserted as far as possible into the aperture 23 so that it will lie within the channel 22 with the shoulders 23' abutting the inner surface of the shell 30. The shell 30 is finally pivoted about the base of the tab 34 and the edges of the aperture 23, thus causing the axle 13 to be received and forced within the wedge shaped slot defined by the arms 36, until the axle is snapped into position within the arcuate recess 35. In order to permit the pivotal movement above described of the eye shell 30 relative to the holding member 20, the lip portion 21 is inclined at a small angle to the body of the holding member 20, as indicated in Fig. 2.

It will be noted that the holding member 20, after it has been bent into shape as illustrated in Figs. 3 and 7, is shorter than the diameter of the hemispherical shell 30 (see Figs. 2 and 3). This permits the shell 30 to shift relative to the holding member 20 and axle 13 between the extreme positions where the ends of the holding member 20 abut the interior surface of the shell 30 adjacent the base of the tab 34 or the recess 35. To prevent the eyeballs 12 from dropping off the axle 13 and holding member 20 in any adjusted axial position, the tab 34 is made of such a length that when the portion of the shell 30 adjacent the notch 35 abuts one end of the holding member 20, the free end of the tab 34 is still captively held within the channel 22. The tab 34 may be freely received in the channel 22 and aperture 23 so as to enable the eyeballs 12 to automatically adjust themselves axially within the sockets 11. If desired, however, the tab 34 may be held in a light frictional grip between the shoulders 23', or said tab may be bent so as to frictionally press against and engage either the holding member 20 or the lip portion 21, thus retaining the eyeballs 12 in any adjusted axial position.

By applying a torsional force to the eyeballs 12 or holding member 20, the same will be rotated together about the axle 13. The eyeballs 12 may thus be independently adjusted to any desired angular position with respect to the axle 13 and the sockets 11, and be held in such adjusted position by the frictional engagement between head 26 of the cotter pin and eye set axle.

In the form of my invention shown in Figs. 8 and 9, the holding members 40 are rigidly attached to the axle 13, as by welding as indicated at 41a (Fig. 9). Said holding member 40 is otherwise formed similarly to the holding member 20 above described and is provided with a similar lip portion 41, aperture 43, shoulders 43'. In this form of my invention the eyeset is assembled by welding the holding member 40 to the axle 13 and thereafter mounting the eyeballs 12 in a manner similar to that described with reference to the embodiment illustrated in Figs. 1 through 7.

The axial adjustment is made in the same way as above described. However, rotational adjustment is effected by twisting the eyeballs 12 with respect to the holding member 40 so as to distort the portion of the tab 34 adjacent the periphery of the shell 30. The metal from which the tab 34 is formed is sufficiently soft to enable such distortion and at the same time sufficiently hard to allow the tab to retain such distorted shape and hold the eyeballs in their adjusted position.

In the embodiment of my invention shown in Figs. 10 and 11, the holding member 60 is formed by slitting opposite longitudinal edges of a flat plate to provide a portion which may be bent around and into frictional engagement with the axle 13 to form a sleeve 61. The other portion of the plate is formed into an eyeball holding member in a manner similar to the form shown in Figs. 2 and 7, so as to provide the shoulders 62, 62' and slot 63 for receiving the tab 34 of the eyeball member.

The eyeballs 12 in this embodiment of my invention are axially adjusted in a manner similar to that hereinabove described with respect to the first two forms. The rotation of the holding member and eyeball about the axis is accomplished through the integral sleeve member 61.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In an eye set, an axle, a holding member on said axle, and an eyeball member mounted on said holding member, one of said members having a tab and the other member a mating slot for said tab, whereby said members may be moved linearly relative to one another, longitudinally of said axle.

2. In an eye set, an axle, a holding member having a non-circular opening therein, the axis of said opening being parallel to said axle, means to mount said holding member on said axle for relative rotation thereabout, said means comprising a member rotatively moveable with said holding member and constricted about said axle, and an eyeball member mounted on said holding member, said eyeball member having a portion parallel to said axle and slidably and captively received in and mating with said opening, whereby said members may be moved linearly relative to one another in the direction of said axle within pre-determined limits.

3. In an eye set, an axle, a holding member, means to mount said holding member on said axle for relative rotation thereabout, said means comprising a cotter pin connected to said holding member and having its head frictionally engaging said axle, said holding member having a body portion and a portion transverse to said body, said transverse portion having a slot, and an eyeball member having a mating tab slidably received in said slot, whereby said members may be moved linearly relative to one another, longitudinally of said axle.

4. In an eye set, an axle, a holding member mounted on said axle for rotation therewith, and an eyeball member mounted on said holding member, said eyeball member having a projection extending in the direction of the axle, and said holding member having a mating opening for slidably receiving said projection, whereby said members may be moved linearly relative to one another in the direction of said axle, said projection on said eyeball member being distortable to permit rotational adjustment of said eyeball member relative to said holding member.

5. In an eye set, an axle, a holding member rigidly attached to said axle, said holding member having a portion extending transverse to said axle outside the end of the said transverse portion having a slot coaxial with the axle, and an eyeball member having an integral tab which is bent inwardly from the outer edge of the eyeball member and slidably received in said slot, whereby said members may be moved linearly relative to one another, in the direction of said axle, said tab being distortable to permit relative rotation of said eyeball member relative to said holding member.

6. In an eye set, an axle, a holding member, means to mount said holding member on said axle for relative rotation thereabout, said means comprising a sleeve formed integrally with said holding member, and an eyeball member having an integral tab parallel to said axle and slidably received in a channel formed in said holding member, whereby said members may be moved linearly relative to one another, longitudinally of said axle.

7. In an eye set, a hemispherical eyeball member, an axle rotatably supporting said eyeball member at a point on its periphery, said axle terminating short of the opposite wall of said eyeball member, and a one-piece holding member rotatably adjustably mounted on said axle and constituting a longitudinal extension thereof which also terminates short of the opposite wall of said eyeball member, said holding member having an opening slidably and non-rotatably receiving a relatively long tongue formed integrally with said eyeball member and projecting inwardly from a portion of the rear edge thereof which is diametrically opposite to the point at which said eyeball member is rotatably supported by said axle.

8. In an eye set, an axle, a holding member frictionally secured to the end of said axle, means to afford adjustment of the angular position of said holding member relative to said axle, and an eyeball member non-rotatably supported on said holding member, one of said members having a projection of substantial length extending in the direction of the axle, and the other member a mating opening for said projection, whereby said members may be moved linearly relative to one another in the direction of said axle, one of said mating parts being located outside the end of the axle, said eyeball member being additionally rotatably and slidably supported on said axle at a point spaced from the end of the axle, the additional support point being located on the periphery of said eyeball member diametrically opposite to the portion of said eyeball member supported by said holding member.

9. In an eye set, an axle, a holding member secured to the end of said axle, and a hemispherical eyeball member non-rotatably supported on said holding member, said holding member having a non-circular opening therein, and said eyeball member having a mating portion of substantial length directed inwardly parallel to the axle toward the end of the axle and slidably received in said opening, whereby said members may be moved linearly relative to one another in the direction of said axle.

10. In an eye set, an axle, a holding member frictionally received on said axle, means to afford adjustment of the angular position of said holding member relative to said axle, and a hemispherical eyeball member non-rotatably supported on said holding member, said holding member having a non-circular opening therein, the axis of said opening being parallel to said axle, and said eyeball member having a mating portion projecting for a substantial distance from the rear edge of said eyeball member in a direction parallel to said axle and slidably and captively received in said opening, whereby said members may be moved linearly relative to one another in the direction of said axle within predetermined limits, said eyeball member being rotatably and slidably supported on said axle at a point spaced from the end of the axle, the additional support point being located on the periphery of said eyeball member diametrically opposite to the portion of said eyeball member supported by said holding member.

11. In an eye set, an axle, a one-piece holding member frictionally received on said axle and rotatively adjustable thereon, and a hemispherical eyeball member non-rotatably supported on said holding member, said holding member having a non-circular opening the axis of which extends in a direction parallel to and spaced from said axle, and said eyeball member having a mating portion slidably received in said opening, whereby said members may be moved linearly relative to one another in the direction of said axle.

12. In an eye set, an axle, a holding member frictionally mounted on said axle for relative rotation thereabout, and a hemispherical eyeball member non-rotatably supported on said holding member, said eyeball member having a non-circular projection extending for a substantial distance in the direction of the axle, and said holding member having a mating opening for slidably receiving said projection, whereby said members may be moved linearly relative to one another in the direction of said axle, said eyeball member being additionally rotatably and slidably supported on said axle at a point spaced from the end of the axle, the additional support point being located on the periphery of said eyeball member diametrically opposite to the portion of said eyeball member supported by said holding member.

13. In an eye set, an axle, a holding member, means to frictionally mount said holding member on said axle for relative rotative adjustment thereabout, said holding member having a main body portion and a portion transverse to said main body portion, the axis of said body portion being coincident with the axis of said axle, said transverse portion having a non-circular aperture, and an eyeball member having a portion projecting therefrom for a substantial distance in the direction of the axle and mating with and slidably received in said aperture, whereby said members may be moved linearly relative to one another in the direction of said axle.

LOUIS KRIEGSFELD.